Oct. 27, 1931.  P. TAKIGUCHI  1,829,687
ARBOREAL ARTICLE
Filed Jan. 12, 1931
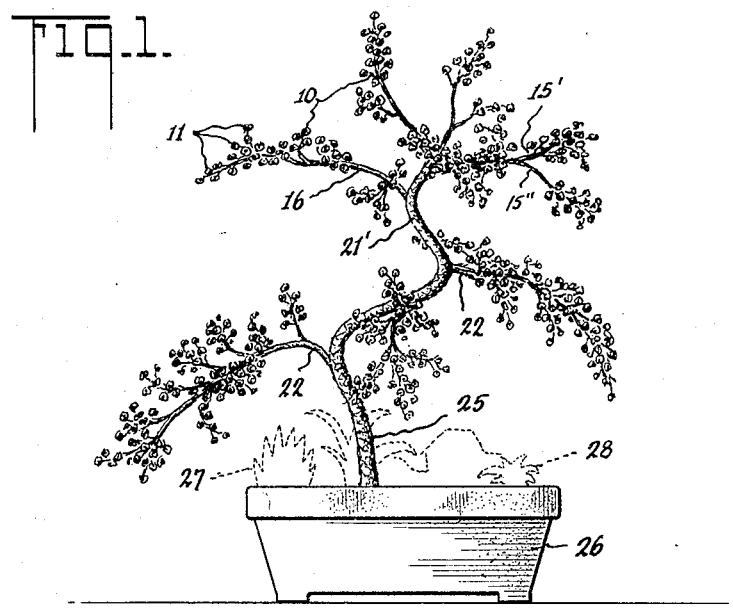
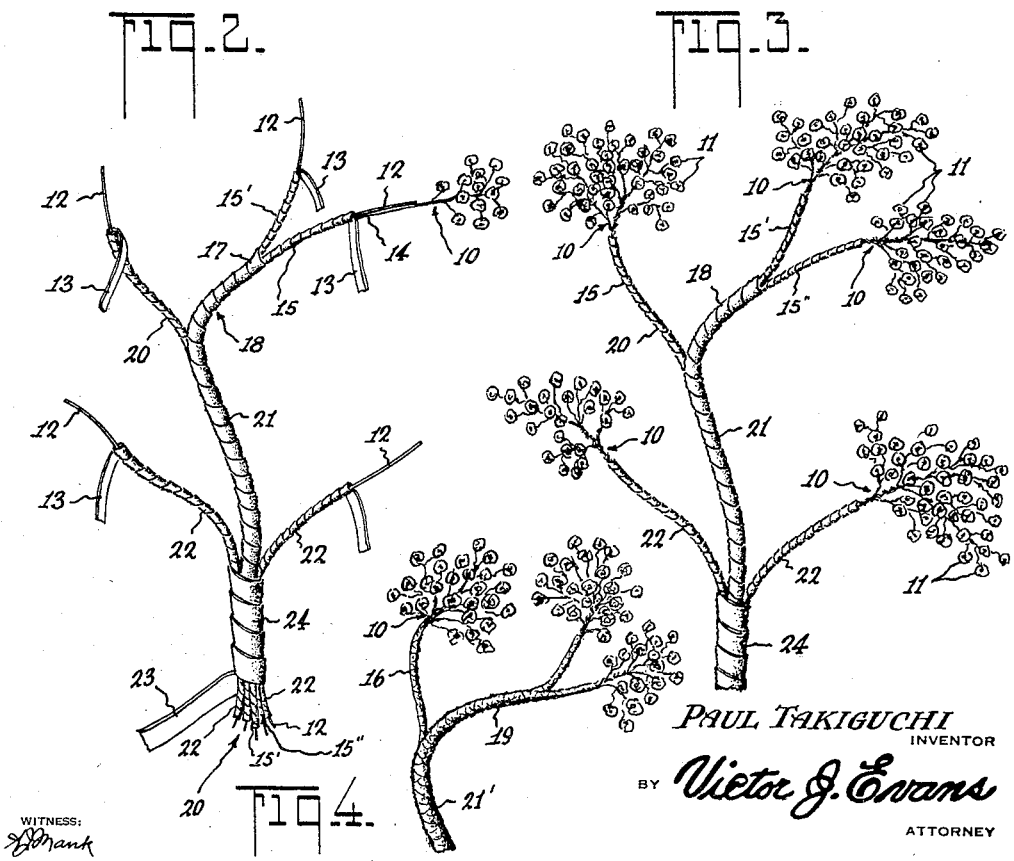

Patented Oct. 27, 1931

1,829,687

UNITED STATES PATENT OFFICE

PAUL TAKIGUCHI, OF NEW YORK, N. Y.

ARBOREAL ARTICLE

Application filed January 12, 1931. Serial No. 508,245.

This invention relates to arboreal articles and aims particularly to provide a novel decorative dwarfed tree and the like constructed partly artificially and partly of natural foliage or fruits of growing trees, plants or shrubs.

The primary object of the invention is to produce an arboreal article artificially, utilizing fruits or foliage of a growing tree, plant or shrub which when removed at a certain condition of growth may undergo desiccation, either naturally, through age, or artificially, so that the natural appearance of the fruit remains practically indefinitely, and combining the desiccated plant portions with artificial supporting means in the form of stems, branches and trunk so constructed that the artificial portions simulate the horny or gnarled appearance of a natural tree's trunk, branches and stems, whereby an artistic article of arboreal character is produced for decorative purposes which is imperishable and will at all times present the appearance of a natural tree or shrub, though preferably in dwarfed form.

The present improvements are not to be confused with artifical flowers, plants or shrubs as heretofore produced, or with artificial mountings for flowers and the like as used in floral pieces, the former presenting at all times, even to an unskilled eye, the artificial appearance, while the latter is only designed for temporary use and is perishable.

The present novel dwarfed tree or shrub is artistically combinable with natural, growing plants of various kinds, all being contained in a suitable flower pot or the like, the natural growing plants being regularly watered and otherwise cared for. The combination of the natural growing plants with the natural appearing trunk and branches of the arboreal article, with the latter's natural desiccated fruits or foliage, presents an appearance of complete naturalness to the entire ensemble, the desiccated fruits or foliage representing a certain state of their natural growth and the artificial portions of the article being practically indetectible.

It is a further object of the invention to construct an artifical dwarfed tree trunk and branches in an improved manner whereby the same simulates the natural growing appearance with more fidelity than has been possible heretofore.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings which latter show embodiments of the invention as at present preferred.

In the drawings:

Fig. 1 is a side elevation of the present arboreal article in one of its forms, illustrating its combination with natural growing flora;

Fig. 2 is a detail view illustrating the construction of the trunk and branches in somewhat exaggerated form, for purposes of clarity;

Fig. 3 is a diagrammatic side elevation similar to Figure 2, indicating the manner of construction of the complete article; and Fig. 4 is a view of one of the completed branches, showing the final effect produced.

In producing the present article I first select a number of twigs of a growing tree, shrub or plant, the tree, plant or shrub being of such character that the fruit or flowers thereof, when desiccated, still maintain a natural appearance, the moisture being removed either during a certain stage of the growth of the tree or shrub, or the twigs being dried and the moisture removed artificially. Suitable plants or the like I have found to be the trailing plant commonly called bittersweet, the employment of which is here illustrated. Other varieties of suitable plants are Zepusofelia, Honesty, and the like.

In this instance the dried twigs 10 of the bittersweet having their scarlet berries 11, are each mounted at one end of a relatively stiff but bendable length of wire 12 by means of a specially prepared narrow tape 13, the tape 13 being preferably wound spirally about the wire 12, commencing at the bottom, the tape being also wound about the stem of the twig or flower as indicated at 14 in Figure 2. This winding of the stem is diagrammatically shown at 15 in Figure 3, but the character of the tape 13 is such that the completed winding appears as shown at 16 in Figures 1 and 4, wherein the completed stem attains an external horny or gnarled appearance simulating a natural woody stem so closely that the difference is practically unnoticeable.

The tape 13 is preferably formed of flexible fabric material treated with a solution of gutta percha so that the tape presents a roughened or leather like appearance, suitable dark coloring being introduced to represent the natural color of the stem.

A plurality of wired stems 15 are then assembled as indicated at 15' and 15" and wound with another prepared tape 17 which is similar to the tape 13, but of greater width, thus producing a branch 18 of greater thickness than the stems 15 the final appearance of which is as shown at 19. The tape 17 in this instance is also wound about one or more additional lower stems, as seen at 20 these stems 20 being also formed of wires 12 wound with tape 13, so that the branch 18 increases progressively in thickness from top to bottom as seen at 21 thus simulating the proportions of the upper part of a natural trunk as indicated in its finished form at 21'.

Additional tape-wound stems are then laid alongside the stems united by the tape 17, as indicated at 22; and these stems 22, together with the upper projecting stems 15' 15" and 20 are wound together as a unit by still another prepared tape 23, of greater width than the tape 17, in the manner indicated at 24, thus producing a thickness representing the main trunk of the tree. The finished trunk is indicated at 25 in Fig. 1.

The entire trunk, including the portions 25 21' and 19, thus decreases in thickness from bottom to top, and is then bent, as are also the finished stems 16, in form to simulate a natural tree, but in dwarfed condition.

When thus completed, the arboreal article is suitably secured in a flower pot or the like 26. The pot is preferably provided with earth to support and nourish one or more growing plants as seen at 27 and 28. The entire ensemble thus resembles a living group in toto, it being a practical impossibility to detect the artificial portion without the closest inspection.

Considerable particularities of description, as to materials, part details, dimensions, capacities and utilities may have been herein indulged in, but it will be understood that these statements, made with particular reference to that one, and the one more preferred, of the many possible embodiments of the invention which is illustrated in the drawings, are not in any way to be taken as definitive or limitative of the invention. Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, as a matter of language, might be said to fall therebetween.

In other words, the scope of protection contemplated is to be taken solely from the appended claims, interpreted as broadly as is consistent with the prior art.

What I claim as new is:

1. An arboreal article simulating a natural growing dwarfed tree including in combination, a plurality of desiccated natural floral elements, a flexible metal wire stem foundation for each of said desiccated floral elements, a flexible fabric gum treated tape wound about said wire foundation and about said stem portion to simulate a complete natural stem and to secure said floral element in place on said stem, a second flexible fabric gum treated tape, of greater width than said first tape, wound about a plurality of said stems in simulation of a natural branch and upper tree-trunk portion, a plurality of stems disposed alongside said branch portion, a third flexible fabric gum treated tape, of greater width than said second tape, wound about said branch portion and said overlying plurality of stems, in simulation of the enlarged diameter base portion of a tree-trunk, whereby the outer surfaces of said tape-wound stem, branch and trunk portions present a gnarled appearance simulating the corresponding portions of a natural growing tree while said desiccated floral elements constitute actual natural plant portions imparting a natural living appearance to said article.

2. An arboreal article simulating a natural growing dwarfed tree including in combination, a plurality of desiccated natural floral elements, each having a stem portion, a flexible metal wire stem foundation for each of said desiccated floral elements, a flexible fabric gum impregnated tape wound spirally about said wire foundation and about said stem portion to simulate a complete natural stem and to secure said floral element in place on said stem, a second flexible fabric gum impregnated tape, of greater width than said first tape, wound spirally about a plurality of said stems in simulation of a natural branch and upper tree-trunk portion, a plurality of stems disposed alongside said branch portion, a third flexible fabric gum impregnated tape, of greater width than said second tape, wound spirally about said branch portion and said overlying plurality of stems, in simulation of the enlarged diameter base portion of a tree-trunk, whereby the outer surfaces of said tape-wound stem, branch and trunk portions present a gnarled appearance simulating the corresponding portions of a natural growing tree while said desiccated floral elements constitute actual natural plant portions imparting a natural living appearance to said article.

3. An arboreal article simulating a natural growing dwarfed tree including in combination, a plurality of desiccated natural floral elements, each having a stem portion, a flexible metal wire stem foundation for each of said desiccated floral elements, a flexible fabric gutta percha impregnated tape wound spirally about said wire foundation and about said stem portion to simulate a complete natural stem and to secure said floral element in place on said stem, a second flexible fabric gutta-percha impregnated tape, of greater width than said first tape, wound spirally about a plurality of said stems in simulation of a natural branch and upper tree-trunk portion, a plurality of stems disposed alongside said branch portion, a third flexible fabric gutta-percha impregnated tape, of greater width than said second tape, wound spirally about said branch portion and said overlying plurality of stems, in simulation of the enlarged diameter base portion of a tree-trunk, whereby the outer surfaces of said tape-wound stem, branch and trunk portions present a gnarled appearance simulating the corresponding portions of a natural growing tree while said desiccated floral elements constitute actual natural plant portions imparting a natural living appearance to said article, and a mounting for said article including a plurality of natural living plants surrounding the base of said trunk portion.

In testimony whereof I hereby affix my signature.

PAUL TAKIGUCHI.